United States Patent [19]
Hagström et al.

[11] 3,841,491
[45] Oct. 15, 1974

[54] DIALYSIS APPARATUS

[75] Inventors: Olov Hagström, Lund; Gerhard Riede, Eslov, both of Sweden

[73] Assignee: Gambro AG, Bern, Switzerland

[22] Filed: Apr. 2, 1973

[21] Appl. No.: 346,820

[30] Foreign Application Priority Data
Apr. 26, 1972 Sweden.............................. 5475/72

[52] U.S. Cl. .............................................. 210/321
[51] Int. Cl............................................ B01d 31/00
[58] Field of Search ................ 210/22, 23, 456, 321

[56] References Cited
UNITED STATES PATENTS 3,501,011  3/1970  Alwall et al.......................... 210/321
3,741,395  6/1973  Zimmerman..................... 210/494 X

*Primary Examiner*—Frank A. Spear, Jr.
*Attorney, Agent, or Firm*—Pierce, Schleffler & Parker

[57] ABSTRACT

A dialysis apparatus, particularly for purifying blood includes an assembly of flat supporting plates stacked together with pairs of membranes interposed between the sides of adjacent plates. These membranes form passageways between them for the liquid to be purified, and other passageways are formed between each plate and the adjacent membrane for circulating the purifying liquid. The assembly of supporting plates and membrane pairs are traversed by tubular shafts for the purifying liquid and these shafts include distributing disks which clamp the respective pairs of membranes to the adjacent support plate.

4 Claims, 9 Drawing Figures

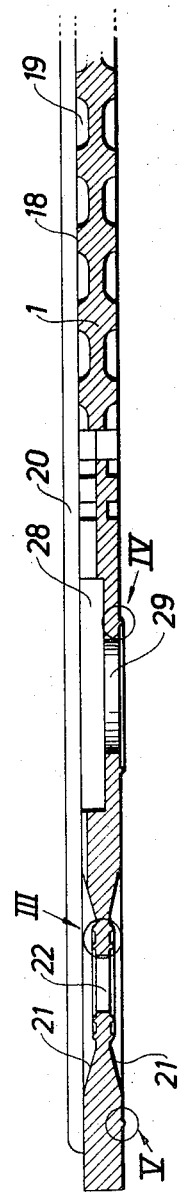
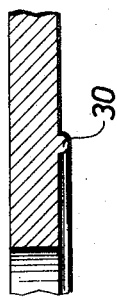
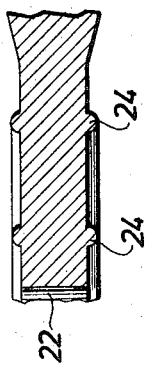
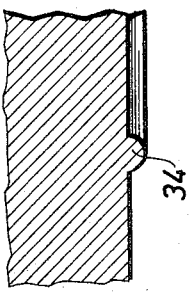

DIALYSIS APPARATUS

The present invention relates to a dialysis apparatus, preferably designed for purifying blood and comprising a number of supporting plates arranged with their flat sides bearing against each other and with interposed pairs of membranes, said membranes forming between them passages for the liquid to be purified while between the respective membrane and adjacent supporting plate are provided passages for purifying liquid, the assembly formed by supporting plates and membrane being traversed by distributing shafts for the purifying liquid, said shafts containing distributing disks adapted to clamp the respective pair of membranes to adjacent supporting plate.

More exact distinctive features of the dialysis apparatus according to the invention appear from the following claims. As mentioned, the dialysis apparatus according to the invention is primarily designed for the purifying of blood. In the following the invention therefore will be described with reference to blood dialysis. To a man skilled in the art, however, it will be evident from the following description that the invention of course also may be applied to dialysis of other liquids.

An up-to-date dialysis apparatus for purifying blood, i.e., a so-called artificial kidney, must satisfy several conditions. In constructing the kidney according to the present invention it has been aimed at satisfying as many of said conditions as possible. The following is mentioned as instances of conditions which should be satisfied.

The dialysis effect should be good also when using a very small quantity of blood.

The flow resistance in the blood passages should be infinitesimal so that if possibly the use of a blood pump can be dispensed with.

The quantity of blood remaining after treatment should be as low as possible, so that it will not be necessary to supply the patient with any additional blood or a smallest possible quantity thereof. The fact is that every additional supply of blood entails a risk of hepatitis to the patient.

The staff handling the artificial kidney should not need to contact either the blood or the purifying liquid. Also in this case there is, indeed, involved a risk of hepatitis.

The total weight of the kidney should be as low as possible. The details included in the kidney should be simple and inexpensive to produce in mass production so that the kidney after use may be thrown away.

The flow of blood as well of the salt solution should be uniform over the total cross section area of the kidney so that all of the blood is effectively purified. Thus, there should be a uniform distribution specially of the blood, partly within the respective pair of membranes and partly between the individual pairs of membranes.

The kidney should form a completely closed system which can be directly connected to suitable hoses for blood and purifying liquid. These hoses, too, preferably may be disposable to consequently make it possible to throw away the system as a whole after use.

In order to provide an effective purifying of the blood without using an excessive quantity thereof, the kidney should consist of plurality of parts. It must be possible to handle the parts in a simple way, and simultaneously every possibility of leakage between passages for blood and purifying liquid must be eliminated.

Membranes included in the kidney for separating blood and purifying liquid must be effectively supported such that the stress thereon will not be as high that a fracture is to be feared.

The conditions set forth above and a plurality of further conditions are satisfied by the artificial kidney described below. Reference is made to the accompanying drawings which by way of example illustrate a preferred embodiment of the invention.

FIG. 2 is a sectional view of one end of a spacing or supporting plate included in the kidney.

FIG. 3 is an enlarged view of the circular portion III of FIG. 2.

FIG. 4 is an enlarged view of the circular portion IV of FIG. 2.

FIG. 5 is an enlarged view of the circular portion V of FIG. 2.

Figure 1:
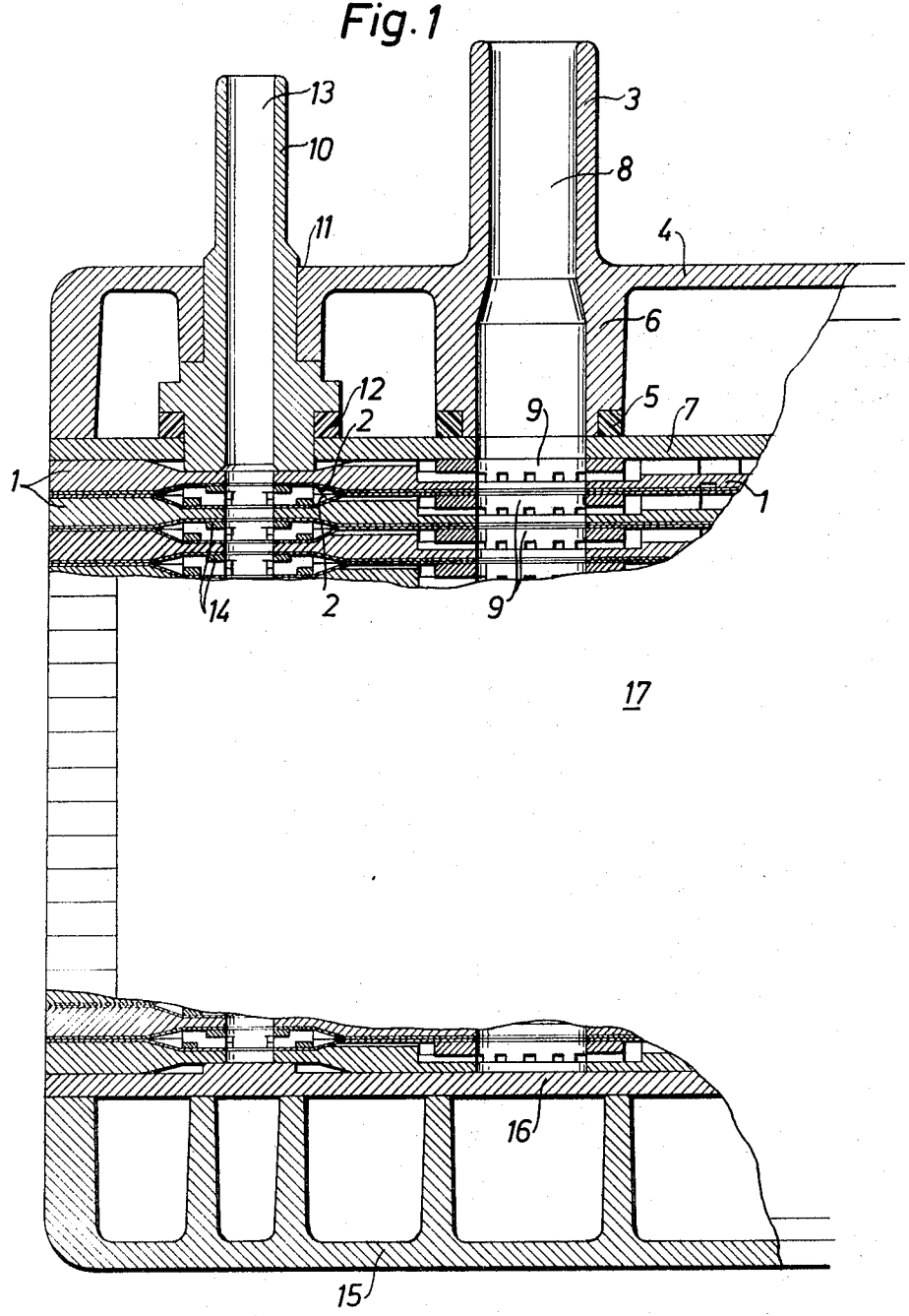
FIG. 1 is a side elevation view, in part in section, of one end of a kidney according to the invention.

As is best shown in FIG. 1 the kidney illustrated by way of example consists of a number of supporting or spacing plates 1 having pairs of interposed membranes 2. The purifying liquid which may be a usual sodium chloride solution having certain medical admixtures, is introduced through a nipple 3. The nipple is integral with a top clamping plate 4. By means of a gasket 5 an extension 6 of the nipple 3 is biased against a top clamping disk 7. The interior of the nipple 3 forms a passage 8 which is extended to the assembly of supporting plates 1 and membranes 2. Each pair of membranes 2, 2 is clamped between distributing disks 9 and the adjacent supporting plate 1. The distributing plates will be more exactly described with reference to FIGS. 8 and 9.

Figure 6:
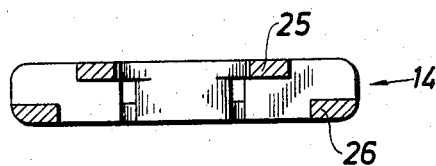
FIGS. 6 and 7 is a sectional view and an in part sectional top view, respectively, of a blood distributing ring included in the kidney.
Figure 7:
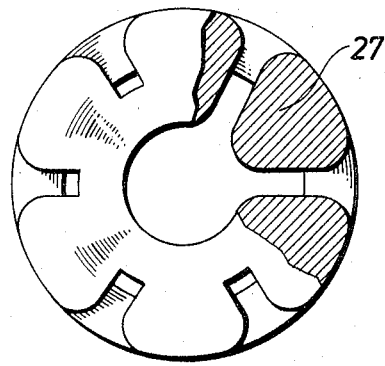

The artificial kidney is supplied with blood by means of a nipple 10 clamped within a bore 11 in the top clamping plate 4. By way of a gasket 12 the nipple 10 is biased against the top clamping disk 7. Within the blood nipple 10 there is a passage 13 the extension of which passes through the assembly formed by the supporting plates 1 and the pairs of membranes 2. Blood distributing buttons 14 are provided within each pair of membranes. With reference to FIGS. 6 and 7 the buttons will be more exactly described in the following.

On the underside of the artificial kidney shown in FIG. 1 there is a bottom clamping plate 15 and a bottom clamping disk 16 which essentially correspond to the top clamping plate 4 and the top clamping disk 7, respectively.

The two clamping plates 4 and 15 may be kept in a tightened position by any suitable means. In the embodiment shown this is effected by means of clamping rails 17 hooked into slots (not shown) in the two plates 4 and 15.

As mentioned above, FIG. 2 shows one end of a supporting plate 1 included in the kidney. The greater part of its surface is occupied by ridges 18 forming between them channels 19 for the purifying liquid. Reference numeral 20 represents guide strips adapted to prevent adjacent supporting plates 1 from being displaced relatively to each other. The supporting plate 1 at one end is provided with conical depressions 21 interconnected by means of an aperture 22. As is best shown in FIG. 3 the depressions 21 are provided with circular sealing strips or sealing beads 24. The beads are adapted to sealingly bear against the adjacent membrane 2 to force the membrane against the blood distributing buttons 14 arranged within the respective membrane pair, as is more clearly shown in FIGS. 6 and 7. The inner bead 24 is adapted to co-operate with the annular element 25 of the blood button 14 while the outer bead 24 is adapted to co-operate with the annular element 26. Thus, the blood distributing button 14 consists of said annular elements 25 and 26 which are interconnected by means of transversal connecting bars 27. In order to allow the blood distributing button to be integrally moulded with the use of simplest possible tools the two annular elements 25 and 26 have such diameters that the largest diameter of the smallest element is smaller than the smallest diameter of the largest element.

Thus, in the embodiment shown the respective membrane 2 is clamped between adjacent supporting plate 1 and blood distributing button 14 by means of the annular beads 24 provided on the supporting plate. To a technician skilled in the art, however, it is obvious that of course it is also possible instead to provide corresponding beads on the blood buttons 14.

In order to provide smallest possible resistance to the blood the connecting rods 27 have essentially a triangular cross-section the corners of which being rounded off and one corner being directed towards the centre of the button while the opposite side is rounded off and aligned with the outer periphery of the larger annular element 26.

Figure 8:
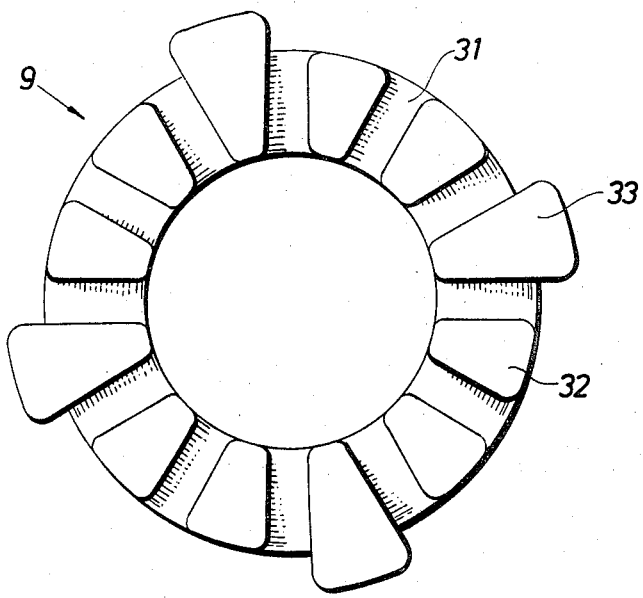
FIGS. 8 and 9 is a top and a sectional view, respectively, of a distributing disk included in the kidney.
Figure 9:
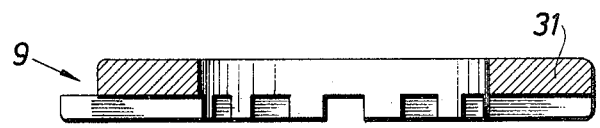

To the right of the depressions 21 the supporting plate according to FIG. 2 is provided with a circular recess 28 having a central aperture 29 which forms an extension of the passage 8 of the nipple 3. As is best shown in the enlarged view of FIG. 4 the aperture 29 is surrounded by an annular sealing flange or sealing bead 30 which is adapted between it and the adjacent distributing disk 9 to clamp a membrane pair 2, 2. The distributing disk is shown in FIGS. 8 and 9. The disk is integrally moulded and consists of an annular element 31 having projecting distance members 32 and 33. The distance members 32 and 33 are adapted to bear against the bottom of the recess 28 and have an essentially triangular cross-section the corners of which being rounded off and one corner being directed towards the centre of the disk while the opposite side thereof is rounded off and adapted to follow either the outer periphery of the annular element 31 or the outer periphery of the recess 28. Of course, a corresponding sealing bead, however, may be provided on the distributing disk 9 proper rather than the supporting plate 1.

In FIG. 5 is shown in an enlarged view a sealing bead 34 extending all around the supporting plate 1 and adapted to clamp each membrane pair along the periphery thereof.

In FIGS. 1 and 2 only one end of a kidney and a supporting plate, respectively, is shown. Preferably, the opposite end has a mirror symmetrical shaping, but of course it may have any desired shape.

The invention of course is not limited merely to the embodiment described above but may be varied within the scope of the following claims. Thus, for instance, the shape of the details to a certain extent may be varied in accordance with the material from which they are manufactured.

We claim:

1. A dialysis apparatus comprising a plurality of stacked supporting plates and a plurality of pairs of membranes, each pair of membranes being disposed between a pair of plates and in stacked relation therewith, said plates being provided with grooves facing said pairs of membranes to permit passage of a liquid to be purified between the membranes of each pair and to permit passage of a purifying liquid between the outside of each pair of membranes and the surface of the adjacent plate, said stack of plates and membranes being provided with holes therethrough forming a distributing passage extending transversely of the stack of plates and membranes for introducing a purifying liquid, annular button-like distributing members disposed in a recess provided in one side of each plate, the center opening of each annular distributing member coinciding with the transverse distributing passage, each member being provided with a continuously annular surface on one side facing away from the recess and forming a seal with the adjacent membrane, the other side of each member being provided with radial grooves extending from the inner central opening to the outer periphery thereof to provide passages for the purifying liquid and spacing elements therebetween, said grooves and spacing elements facing the bottom of the recess provided in the one side of said plate whereby purifying liquid may be passed into said transverse distributing passage then outwardly and radially through said radial passages to pass between the outer surface of one of said pairs of membranes and the adjacent plate.

2. A dialysis apparatus as claimed in claim 1 wherein an annular bead is provided on one of (a) the annular surface on the one side of said distributing member and (b) the surface of said adjacent plate surrounding said transverse distributing passage to improve the seal with the pair of membranes therebetween.

3. A dialysis apparatus as claimed in claim 1 wherein the recess in the one side of each plate has a larger diameter than the diameter of each button-like distributing member and at least two diametrically opposed spacing elements of each distributing member extend outwardly from the outer diameter of said member to engage the outer wall of the recess so as to properly position said member in said recess.

4. A dialysis apparatus as claimed in claim 1 wherein said spacing elements have a substantially triangular configuration the edges of which are rounded off to facilitate smooth flow of the purifying liquid.

* * * * *